(12) United States Patent
Dong

(10) Patent No.: US 10,999,799 B2
(45) Date of Patent: May 4, 2021

(54) COMMUNICATION METHOD AND COMMUNICATION APPARATUS FOR WIRELESS LOCAL AREA NETWORK, AND ACCESS POINT AND STATION

(71) Applicant: Meizu Technology Co., Ltd., Guangdong (CN)

(72) Inventor: Xiandong Dong, Guangdong (CN)

(73) Assignee: Meizu Technology Co., Ltd., Guangdong (CN)

( * ) Notice: Subject to any disclaimer, the term of this patent is extended or adjusted under 35 U.S.C. 154(b) by 0 days.

(21) Appl. No.: 16/319,579

(22) PCT Filed: Jul. 19, 2017

(86) PCT No.: PCT/CN2017/093582
§ 371 (c)(1),
(2) Date: Jan. 22, 2019

(87) PCT Pub. No.: WO2018/040776
PCT Pub. Date: Mar. 8, 2018

(65) Prior Publication Data
US 2020/0128483 A1    Apr. 23, 2020

(30) Foreign Application Priority Data
Sep. 1, 2016    (CN) .......................... 201610800926.8

(51) Int. Cl.
*H04W 52/02* (2009.01)
*H04W 74/08* (2009.01)

(52) U.S. Cl.
CPC ... *H04W 52/0229* (2013.01); *H04W 52/0235* (2013.01); *H04W 74/0808* (2013.01)

(58) Field of Classification Search
CPC ......... H04W 52/0209; H04W 52/0225; H04W 52/0229; H04W 52/0235; H04W 52/0245; H04W 74/0808
See application file for complete search history.

(56) References Cited

U.S. PATENT DOCUMENTS

| | | | |
|---|---|---|---|
| 7,477,621 B1 * | 1/2009 | Loc ....................... | H04W 28/20 370/329 |
| 7,483,403 B2 * | 1/2009 | Herrmann ............... | H04L 12/12 370/310 |

(Continued)

FOREIGN PATENT DOCUMENTS

| | | |
|---|---|---|
| CN | 1684441 A | 10/2005 |
| CN | 101184005 A | 5/2008 |

(Continued)

OTHER PUBLICATIONS

First Search Report for Chinese Application No. 201610800926.8 dated Aug. 12, 2019, 2 pages.

(Continued)

*Primary Examiner* — Kevin D Mew
(74) *Attorney, Agent, or Firm* — Bret E. Field; Bozicevic, Field & Francis LLP

(57) ABSTRACT

The present disclosure provides an area communication method and a communication apparatus for a wireless local area network, and an access point and a station. The communication method for a wireless local area network comprises: receiving a communication frame, and sensing a receiving power of the communication frame via a CS/CCA state machine, wherein a CS/CCA state machine for sensing a wake-up frame and a CS/CCA state machine for sensing a non-wake-up frame are physically separated or logically separated; and determining the type of the communication frame, according to the receiving power of the communication frame. In the technical solution of the present disclo- (Continued)

sure, a device can respectively sense a wake-up frame and a normal data frame via different CS/CCA state machines physically separated or logically separated, fulfilling the requirements of a WUR, and thereby facilitating the reduction of device energy consumption.

11 Claims, 3 Drawing Sheets

(56) References Cited

U.S. PATENT DOCUMENTS

| | | | | |
|---|---|---|---|---|
| 8,837,524 | B2* | 9/2014 | Liu | H04L 27/2613 |
| | | | | 370/474 |
| 9,077,594 | B2* | 7/2015 | Banerjea | H04L 27/2613 |
| 9,477,292 | B1* | 10/2016 | Murali | G06F 1/3243 |
| 9,585,091 | B2* | 2/2017 | Jafarian | H04W 74/085 |
| 9,749,958 | B1* | 8/2017 | Segev | H04W 52/0216 |
| 9,867,130 | B2* | 1/2018 | Xhafa | H04W 52/0229 |
| 2010/0315983 | A1* | 12/2010 | Choi | H04W 52/0251 |
| | | | | 370/311 |
| 2011/0046698 | A1* | 2/2011 | Kivi | H04W 76/19 |
| | | | | 607/60 |
| 2011/0116489 | A1 | 5/2011 | Grandhi | |
| 2011/0317600 | A1* | 12/2011 | Thomson | H04B 1/005 |
| | | | | 370/311 |
| 2012/0243454 | A1* | 9/2012 | Hwang | H04W 52/0241 |
| | | | | 370/311 |
| 2013/0231151 | A1 | 9/2013 | Kneckt et al. | |
| 2014/0050133 | A1* | 2/2014 | Jafarian | H04W 74/085 |
| | | | | 370/311 |
| 2015/0127733 | A1 | 5/2015 | Ding et al. | |
| 2016/0007288 | A1* | 1/2016 | Samardzija | H04W 52/0229 |
| | | | | 370/311 |
| 2016/0179176 | A1* | 6/2016 | Kohara | G06F 1/3237 |
| | | | | 713/322 |
| 2016/0183187 | A1* | 6/2016 | Park | H04W 52/0225 |
| | | | | 370/311 |
| 2017/0374621 | A1* | 12/2017 | Itagaki | H04L 43/16 |
| 2018/0167864 | A1* | 6/2018 | Johnston | H04W 52/0251 |

FOREIGN PATENT DOCUMENTS

| | | |
|---|---|---|
| CN | 102893678 A | 1/2013 |
| CN | 104272807 A | 1/2015 |
| CN | 104584649 A | 4/2015 |
| CN | 104737597 A | 6/2015 |
| EP | 1587221 A | 10/2005 |

OTHER PUBLICATIONS

First Office Action for Chinese Application No. 201610800926.8 dated Aug. 20, 2019, 3 pages.

Standard for Information Technology—Telecommunications and information exchange between systems—Local and Metropolitan Area networks—Specific requirements—Part 11: Wireless LAN Medium Access Control (MAC) and Physical Layer (PHY) specifications; ANSI/IEEE Std 802.11, 1999 Edition (R2003), IEEE Standard, IEEE, Piscataway, NJ USA, Nov. 30, 1998, pp. 1-528, XP068150169, DOI: 10.1109/IEEESTD. 1998, 8684613 ISBN: 978-0-7381-1659-4 [retrieved on Apr. 5, 2019], pp. 154-163.

Extended European Search Report for European Application No. 17845079.7 dated Mar. 26, 2020, 9 pages.

* cited by examiner

COMMUNICATION METHOD AND COMMUNICATION APPARATUS FOR WIRELESS LOCAL AREA NETWORK, AND ACCESS POINT AND STATION

PRIORITY CLAIM AND RELATED APPLICATION

The present application claims the priority of Chinese Patent Application No. 201610800926.8, filed in the Chinese Patent Office on Sep. 1, 2016, and entitled "COMMUNICATION METHOD AND COMMUNICATION APPARATUS FOR WIRELESS LOCAL AREA NETWORK, AND ACCESS POINT AND STATION", the entire contents of which are herein incorporated by reference.

TECHNICAL FIELD

The present disclosure relates to the field of communication technology, and more specifically relates to a communication method for a wireless local area network, a communication apparatus for a wireless local area network, a station and an access point.

BACKGROUND

In July 2016, 802.11 established a research group WUR (Wake-Up Receiver) of next generation Wi-Fi (Wireless Fidelity) technology, which was mainly used in the Internet of Things in order to save the power consumption of the devices as much as possible.

In the standard-setting process, two forms of receiving data by a device are defined in a document: the first is to receive a normal data packet; the second is to receive a wake-up frame, wherein after receiving a wake-up frame, a master communication device in a sleep state will restore an awake state for normal data communication. Thus, the purpose of defining a wake-up frame is to facilitate saving power consumption of the device, wherein the main communication refers to data communication of IEEE802.11 or other signaling communication, e.g., sending a probe request frame, etc.

In order to fulfill the requirements of the WUR, for a CS (Carrier Sense)/CCA (Clear Channel Assessment) state machine, two states need to be defined: a state of sensing a normal data frame and a state of sensing a wake-up frame.

However, in the existing Wi-Fi standards, only the state machine for sensing a normal data frame is specified, and the state machine for sensing a wake-up frame is not specified. Therefore, it is necessary to redefine the state machine in order to fulfill the requirements of the WUR.

SUMMARY

Just based on at least one of the technical problems described above, the present disclosure proposes a new communication solution for a wireless local area network, so that a device can respectively sense a wake-up frame and a normal data frame via different CS/CCA state machines physically separated or logically separated, fulfilling the requirements of the WUR, and thereby facilitating the reduction of device energy consumption.

In view of this, according to the first aspect of the present disclosure, there is provided a communication method for a wireless local area network, comprising: receiving a communication frame, sensing a receiving power of the communication frame via a CS/CCA state machine, wherein a CS/CCA state machine for sensing a wake-up frame and a CS/CCA state machine for sensing a non-wake-up frame are physically separated or logically separated; and determining the type of the communication frame, according to the receiving power of the communication frame.

In this technical solution, since the CS/CCA state machine for sensing a wake-up frame and the CS/CCA state machine for sensing a non-wake-up frame are physically separated or logically separated, the device can respectively sense a wake-up frame and a normal data frame (such as a non-wake-up frame) via different CS/CCA state machines physically separated or logically separated, fulfilling the requirements of the WUR, and thereby facilitating the reduction of device energy consumption. In addition, since the sending power of the wake-up frame is generally small, by determining the type of the communication frame according to the receiving power of the communication frame, it is also possible to easily distinguish between the wake-up frame and the normal data frame, so as to ensure efficient utilization of the WUR mechanism.

In the above, when the CS/CCA state machine for sensing a wake-up frame and the CS/CCA state machine for sensing a non-wake-up frame are physically separated, the two state machines are two physical entities; and when the CS/CCA state machine for sensing a wake-up frame and the CS/CCA state machine for sensing a non-wake-up frame are logically separated, the two state machines share one physical entity.

In the above-mentioned technical solution, preferably, the step of determining, according to the receiving power of the communication frame, the type of the communication frame specifically comprises: determining that the communication frame is a wake-up frame, when the receiving power of the communication frame is less than or equal to a predetermined power value; and determining that the communication frame is a non-wake-up frame, when the receiving power of the communication frame is greater than the predetermined power value.

In any of the above-mentioned technical solutions, preferably, the communication method for a wireless local area network further comprises: entering an awake state to communicate with a sender of the communication frame, when it is determined that the communication frame is a wake-up frame.

For example, before receiving the wake-up frame, the device is in a sleep state, a power saving state, or a state defined by the wake-up frame (this state also serves to reduce the power consumption of the device), which can effectively reduce the power consumption of the device. When receiving the wake-up frame, the device enters an awake state to communicate with the sender of the communication frame.

According to the second aspect of the present disclosure, there is further provided a communication method for a wireless local area network, comprising: generating a wake-up frame; and sending the wake-up frame by using a sending power which is less than or equal to a predetermined value.

In the technical solution, by making the sending power of the wake-up frame less than or equal to a predetermined value, the sending of the wake-up frame can cause as little interference as possible to the transmission of other data frames, and at the same time, after receiving the wake-up frame, the receiver of the wake-up frame can determine, according to the receiving power of the wake-up frame, that it is a wake-up frame that has been received.

According to the third aspect of the present disclosure, there is further provided a communication apparatus for a wireless local area network, comprising: a receiving unit for receiving a communication frame; a sensing unit for sensing a receiving power of the communication frame via a CS/CCA state machine, wherein a CS/CCA state machine for sensing a wake-up frame and a CS/CCA state machine for sensing a non-wake-up frame are physically separated or logically separated; and a determining unit for determining the type of the communication frame, according to the receiving power of the communication frame.

In this technical solution, since the CS/CCA state machine for sensing a wake-up frame and the CS/CCA state machine for sensing a non-wake-up frame are physically separated or logically separated, the device can respectively sense a wake-up frame and a normal data frame (such as a non-wake-up frame) via different CS/CCA state machines physically separated or logically separated, fulfilling the requirements of the WUR, and thereby facilitating the reduction of device energy consumption. In addition, since the sending power of the wake-up frame is generally small, by determining the type of the communication frame according to the receiving power of the communication frame, it is also possible to easily distinguish between the wake-up frame and the normal data frame, so as to ensure efficient utilization of the WUR mechanism.

In the above, when the CS/CCA state machine for sensing a wake-up frame and the CS/CCA state machine for sensing a non-wake-up frame are physically separated, the two state machines are two physical entities; and when the CS/CCA state machine for sensing a wake-up frame and the CS/CCA state machine for sensing a non-wake-up frame are logically separated, the two state machines share one physical entity.

In the above-mentioned technical solution, preferably, the determining unit is specifically used for: determining that the communication frame is a wake-up frame, when the receiving power of the communication frame is less than or equal to a predetermined power value; and determining that the communication frame is a non-wake-up frame, when the receiving power of the communication frame is greater than the predetermined power value.

In any of the above-mentioned technical solutions, preferably, the communication apparatus for a wireless local area network further comprises: a processing unit for entering an awake state to communicate with a sender of the communication frame, when the determining unit determines that the communication frame is a wake-up frame.

For example, before receiving the wake-up frame, the device is in a sleep state, a power saving state, or a state defined by the wake-up frame (this state also serves to reduce the power consumption of the device), which can effectively reduce the power consumption of the device. When receiving the wake-up frame, the device enters an awake state to communicate with the sender of the communication frame.

According to the fourth aspect of the present disclosure, there is further provided a communication apparatus for a wireless local area network, comprising: a generating unit for generating a wake-up frame; and a sending unit for sending the wake-up frame by using a sending power which is less than or equal to a predetermined value.

In the technical solution, by making the sending power of the wake-up frame less than or equal to a predetermined value, the sending of the wake-up frame can cause as little interference as possible to the transmission of other data frames, and at the same time, after receiving the wake-up frame, the receiver of the wake-up frame can determine, according to the receiving power of the wake-up frame, that it is a wake-up frame that has been received.

According to the fifth aspect of the present disclosure, there is further provided an access point, comprising: the communication apparatus for a wireless local area network as described above in the third aspect; and/or the communication apparatus for a wireless local area network as described above in the fourth aspect.

According to the sixth aspect of the present disclosure, there is further provided a station, comprising: the communication apparatus for a wireless local area network as described above in the third aspect; and/or the communication apparatus for a wireless local area network as described above in the fourth aspect.

By means of the above-mentioned technical solutions, the device can respectively sense a wake-up frame and a normal data frame via different CS/CCA state machines physically separated or logically separated, fulfilling the requirements of the WUR, and thereby facilitating the reduction of device energy consumption.

DETAILED DESCRIPTION OF THE EMBODIMENTS

In order that the above-mentioned objectives, features and advantages of the present disclosure can be understood more clearly, a further detailed description of the present disclosure will be given below in connection with accompanying drawings and embodiments. It should be noted that the embodiments of the present application and the features in the embodiments can be combined with one another if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

Figure 1:
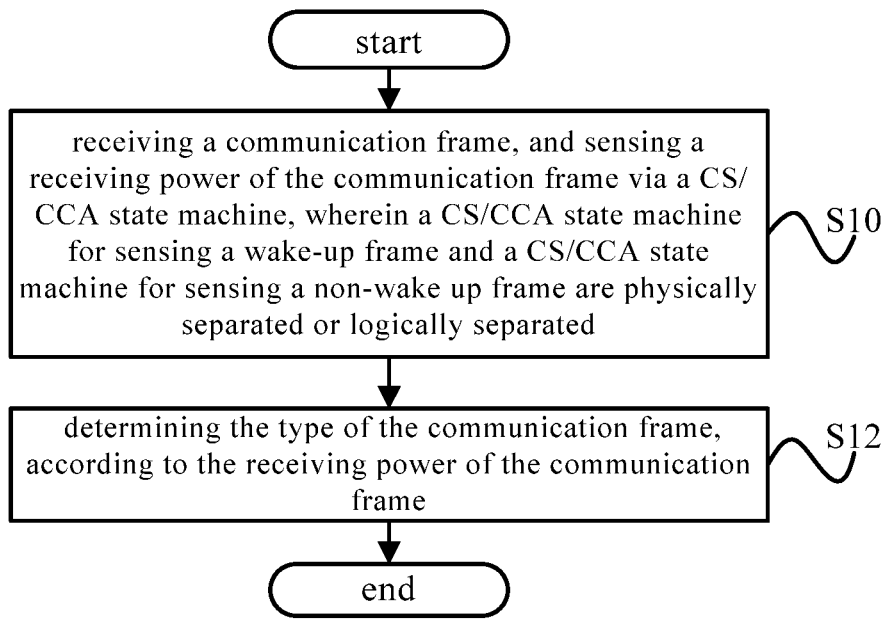
FIG. 1 is a schematic flowchart of a communication method for a wireless local area network according to a first embodiment of the present disclosure.

FIG. 1 is a schematic flowchart of a communication method for a wireless local area network according to a first embodiment of the present disclosure.

As shown in FIG. 1, the communication method for a wireless local area network according to the first embodiment of the present disclosure comprises:

step S10, receiving a communication frame, and sensing a receiving power of the communication frame via a CS/CCA state machine, wherein a CS/CCA state machine for sensing a wake-up frame and a CS/CCA state machine for sensing a non-wake-up frame are physically separated or logically separated; and step S12, determining the type of the communication frame, according to the receiving power of the communication frame.

Specifically, step S12 specifically comprises: determining that the communication frame is a wake-up frame, when the receiving power of the communication frame is less than or equal to a predetermined power value; and determining that the communication frame is a non-wake-up frame, when the receiving power of the communication frame is greater than the predetermined power value.

For example, the transmitting power of the wake-up frame is 100 microwatts, there will be a loss in signal strength during the transmission of the wake-up frame, then the receiving power must be less than 100 microwatts, for example, when the receiving power is greater than 100 microwatts, it can be determined that what has been received is not a wake-up frame. Of course, the transmitting power of the wake-up frame may be other values, which will not be further described here.

In the communication method shown in FIG. 1, since the CS/CCA state machine for sensing a wake-up frame and the CS/CCA state machine for sensing a non-wake-up frame are physically separated or logically separated, the device can respectively sense a wake-up frame and a normal data frame (such as a non-wake-up frame) via different CS/CCA state machines physically separated or logically separated, fulfilling the requirements of the WUR, and thereby facilitating the reduction of device energy consumption. In addition, since the sending power of the wake-up frame is generally small, by determining the type of the communication frame according to the receiving power of the communication frame, it is also possible to easily distinguish between the wake-up frame and the normal data frame, so as to ensure efficient utilization of the WUR mechanism.

In the above, when the CS/CCA state machine for sensing a wake-up frame and the CS/CCA state machine for sensing a non-wake-up frame are physically separated, the two state machines are two physical entities; and when the CS/CCA state machine for sensing a wake-up frame and the CS/CCA state machine for sensing a non-wake-up frame are logically separated, the two state machines share one physical entity.

Further, the communication method for a wireless local area network also comprises: entering an awake state to communicate with a sender of the communication frame, when it is determined that the communication frame is a wake-up frame.

For example, before receiving the wake-up frame, the device is in a sleep state, a power saving state, or a state defined by the wake-up frame (this state also serves to reduce the power consumption of the device), which can effectively reduce the power consumption of the device. When receiving the wake-up frame, the device enters an awake state to communicate with the sender of the communication frame.

In the above, the execution subject of the communication method shown in FIG. 1 may be an access point, such as a router, etc., or may be a station, such as a mobile phone, PDA (Personal Digital Assistant, palm computer) or the like.

Figure 2:
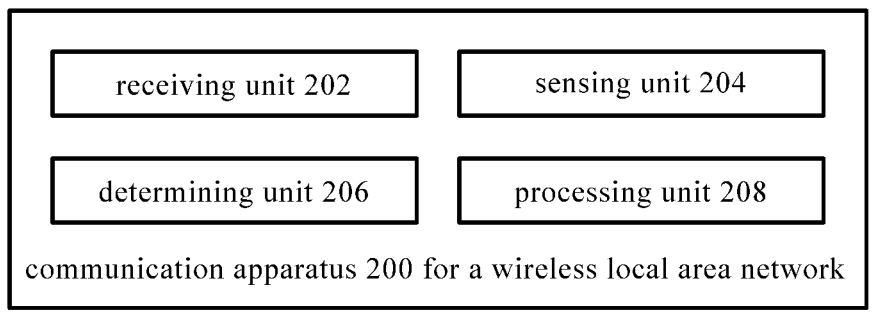
FIG. 2 is a schematic block diagram of a communication apparatus for a wireless local area network according to the first embodiment of the present disclosure.

FIG. 2 is a schematic block diagram of a communication apparatus for a wireless local area network according to the first embodiment of the present disclosure.

As shown in FIG. 2, the communication apparatus 200 for a wireless local area network according to the first embodiment of the present disclosure comprises: a receiving unit 202, a sensing unit 204 and a determining unit 206.

In the above, the receiving unit 202 is used for receiving a communication frame; the sensing unit 204 is used for sensing a receiving power of the communication frame via a CS/CCA state machine, wherein a CS/CCA state machine for sensing a wake-up frame and a CS/CCA state machine for sensing a non-wake-up frame are physically separated or logically separated; and the determining unit 206 is used for determining the type of the communication frame, according to the receiving power of the communication frame.

In specific implementation, the receiving unit 202 may be a receiver, an antenna or the like, and the sensing unit 204 and the determining unit 206 may be a central processor, a baseband processor or the like.

In this technical solution, since the CS/CCA state machine for sensing a wake-up frame and the CS/CCA state machine for sensing a non-wake-up frame are physically separated or logically separated, the device can respectively sense a wake-up frame and a normal data frame (such as a non-wake-up frame) via different CS/CCA state machines physically separated or logically separated, fulfilling the requirements of the WUR, and thereby facilitating the reduction of device energy consumption. In addition, since the sending power of the wake-up frame is generally small, by determining the type of the communication frame according to the receiving power of the communication frame, it is also possible to easily distinguish between the wake-up frame and the normal data frame, so as to ensure efficient utilization of the WUR mechanism.

In the above, when the CS/CCA state machine for sensing a wake-up frame and the CS/CCA state machine for sensing a non-wake-up frame are physically separated, the two state machines are two physical entities; and when the CS/CCA state machine for sensing a wake-up frame and the CS/CCA state machine for sensing a non-wake-up frame are logically separated, the two state machines share one physical entity.

In the above-mentioned technical solution, preferably, the determining unit 206 is specifically used for: determining that the communication frame is a wake-up frame, when the receiving power of the communication frame is less than or equal to a predetermined power value; and determining that the communication frame is a non-wake-up frame, when the receiving power of the communication frame is greater than the predetermined power value.

For example, the transmitting power of the wake-up frame is 100 microwatts, there will be a loss in signal strength during the transmission of the wake-up frame, then the receiving power at which the receiver receives the wake-up frame must be less than 100 microwatts; if the receiving power is greater than 100 microwatts, it can be determined that what the receiver has received is not a wake-up frame. Of course, the sending power of the wake-up frame may be other values, which will not be further described here.

In any of the above-mentioned technical solutions, preferably, the communication apparatus 200 for a wireless local area network further comprises: a processing unit 208 for entering an awake state to communicate with a sender of the communication frame, when the determining unit 206 determines that the communication frame is a wake-up frame.

In specific implementation, the processing unit 208 may be a central processor, a baseband processor or the like.

For example, before receiving the wake-up frame, the device is in a sleep state, a power saving state, or a state defined by the wake-up frame (this state also serves to reduce the power consumption of the device), which can effectively reduce the power consumption of the device. When receiving the wake-up frame, the device enters an awake state to communicate with the sender of the communication frame.

Figure 3:
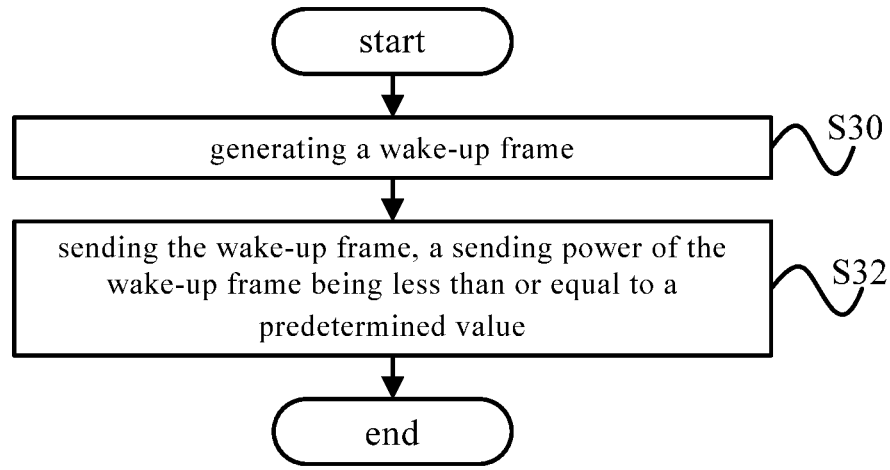
FIG. 3 is a schematic flowchart of a communication method for a wireless local area network according to a second embodiment of the present disclosure.

FIG. 3 is a schematic flowchart of a communication method for a wireless local area network according to a second embodiment of the present disclosure.

As shown in FIG. 3, the communication method for a wireless local area network according to the second embodiment of the present disclosure comprises:

step S30, generating a wake-up frame; and step S32, sending the wake-up frame by using a sending power which is less than or equal to a predetermined value.

In the technical solution, by making the sending power of the wake-up frame less than or equal to a predetermined value, the sending of the wake-up frame can cause as little interference as possible to the transmission of other data frames, and at the same time, after receiving the wake-up frame, the receiver of the wake-up frame can determine, according to the receiving power of the wake-up frame, that it is a wake-up frame that has been received.

Specifically, for example, the sending power of the wake-up frame is set to 100 microwatts, since there will be a loss in signal strength during the transmission of the wake-up frame, the receiving power at which the receiver receives the wake-up frame must be less than 100 microwatts; if the receiving power is greater than 100 microwatts, it can be determined that what the receiver has received is not a wake-up frame. Of course, the sending power of the wake-up frame may be other values, which will not be further described here.

In the above, the execution subject of the communication method shown in FIG. 3 may be an access point, such as a router, etc., or may be a station, such as a mobile phone, PDA or the like.

Figure 4:
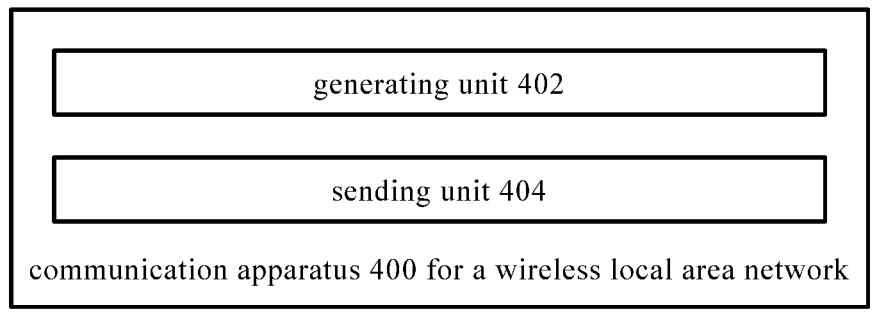
FIG. 4 is a schematic block diagram of a communication apparatus for a wireless local area network according to the second embodiment of the present disclosure.

FIG. 4 is a schematic block diagram of a communication apparatus for a wireless local area network according to the second embodiment of the present disclosure.

As shown in FIG. 4, the communication apparatus 400 for a wireless local area network according to the second embodiment of the present disclosure comprises: a generating unit 402 and a sending unit 404.

In the above, the generating unit 402 is used for generating a wake-up frame; and the sending unit 404 is used for sending the wake-up frame, a sending power of the wake-up frame being less than or equal to a predetermined value.

In specific implementation, the generating unit 402 may be a signal processor, a central processor, a baseband processor or the like; and the sending unit 404 may be a transmitter, an antenna or the like.

In the technical solution, by making the sending power of the wake-up frame less than or equal to a predetermined value, the sending of the wake-up frame can cause as little interference as possible to the transmission of other data frames, and at the same time, after receiving the wake-up frame, the receiver of the wake-up frame can determine, according to the receiving power of the wake-up frame, that it is a wake-up frame that has been received.

Specifically, for example, the sending power of the wake-up frame is set to 100 microwatts, since there will be a loss in signal strength during the transmission of the wake-up frame, the receiving power at which the receiver receives the wake-up frame must be less than 100 microwatts; if the receiving power is greater than 100 microwatts, it can be determined that what the receiver has received is not a wake-up frame. Of course, the sending power of the wake-up frame may be other values, which will not be further described here.

The present disclosure further provides an access point, comprising: the communication apparatus 200 for a wireless local area network as shown in FIG. 2; and/or the communication apparatus 400 for a wireless local area network as shown in FIG. 4.

The present disclosure further provides a station, comprising: the communication apparatus 200 for a wireless local area network as shown in FIG. 2; and/or the communication apparatus 400 for a wireless local area network as shown in FIG. 4.

To sum up, the technical solution of the present disclosure mainly is determining whether a wake-up frame has been received, by increasing the functions of the CS/CCA such that it can receive a frame and sense the type of the frame, thereby determining the operation of the device, which is specifically as follows:

Two sets of CCA determination mechanisms are maintained in a CS/CCA state machine. After the receiver receives a communication frame, the state machine determines the type of the received frame according to the sensed power of the receiver, if the received power is relatively small, it can be determined that a wake up communication frame has been received; and if the power is relatively large, it can be determined that a communication frame other than a wake up communication frame has been received. When it has been determined that the received communication frame is a wake-up frame, if the device is in a sleep state, a power saving state, or a state defined by the wake-up frame, the device is brought into an awake state by call instructions so as to communicate with the sender of the wake-up frame.

Figure 5:
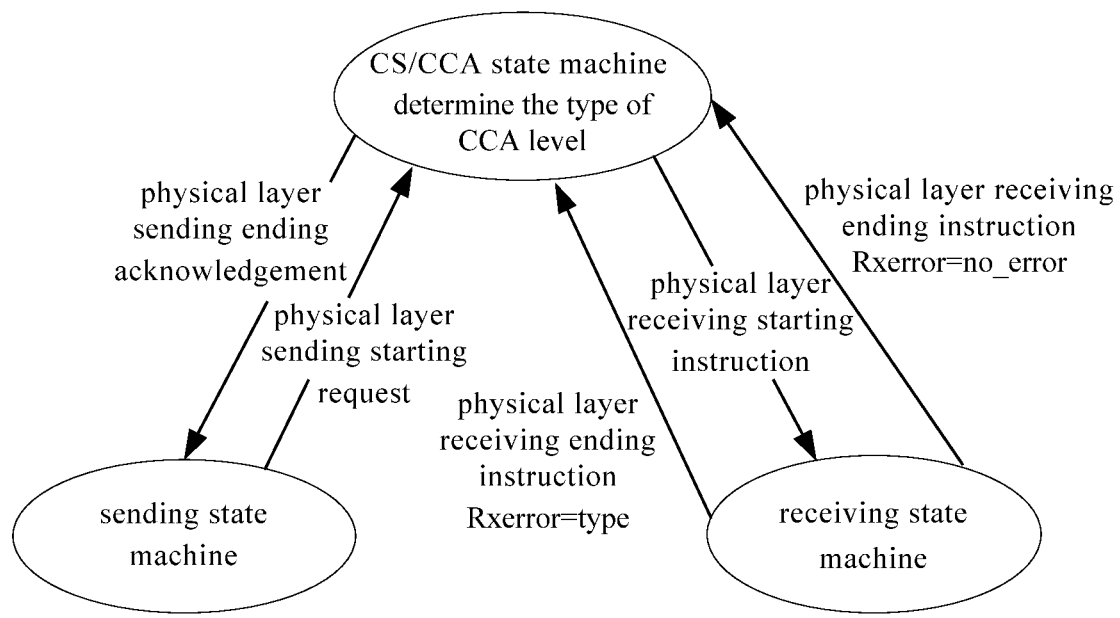
FIG. 5 is a schematic diagram illustrating an interaction process of a CS/CCA state machine with a receiving state machine and a sending state machine according to the first embodiment of the present disclosure.

Specifically, as shown in FIG. 5, one physical entity CS/CCA state machine maintains two sets of CCA determination mechanisms, wherein the CS/CCA state machine for sensing a wake-up frame is logically separated from the CS/CCA for sensing a normal data frame. After the receiving state machine receives a communication frame, the CS/CCA state machine senses the receiving power of the communication frame to determine whether a wake-up frame has been received, and may enter an awake state after receiving a wake-up frame, and data is sent by a sending state machine.

Figure 6:
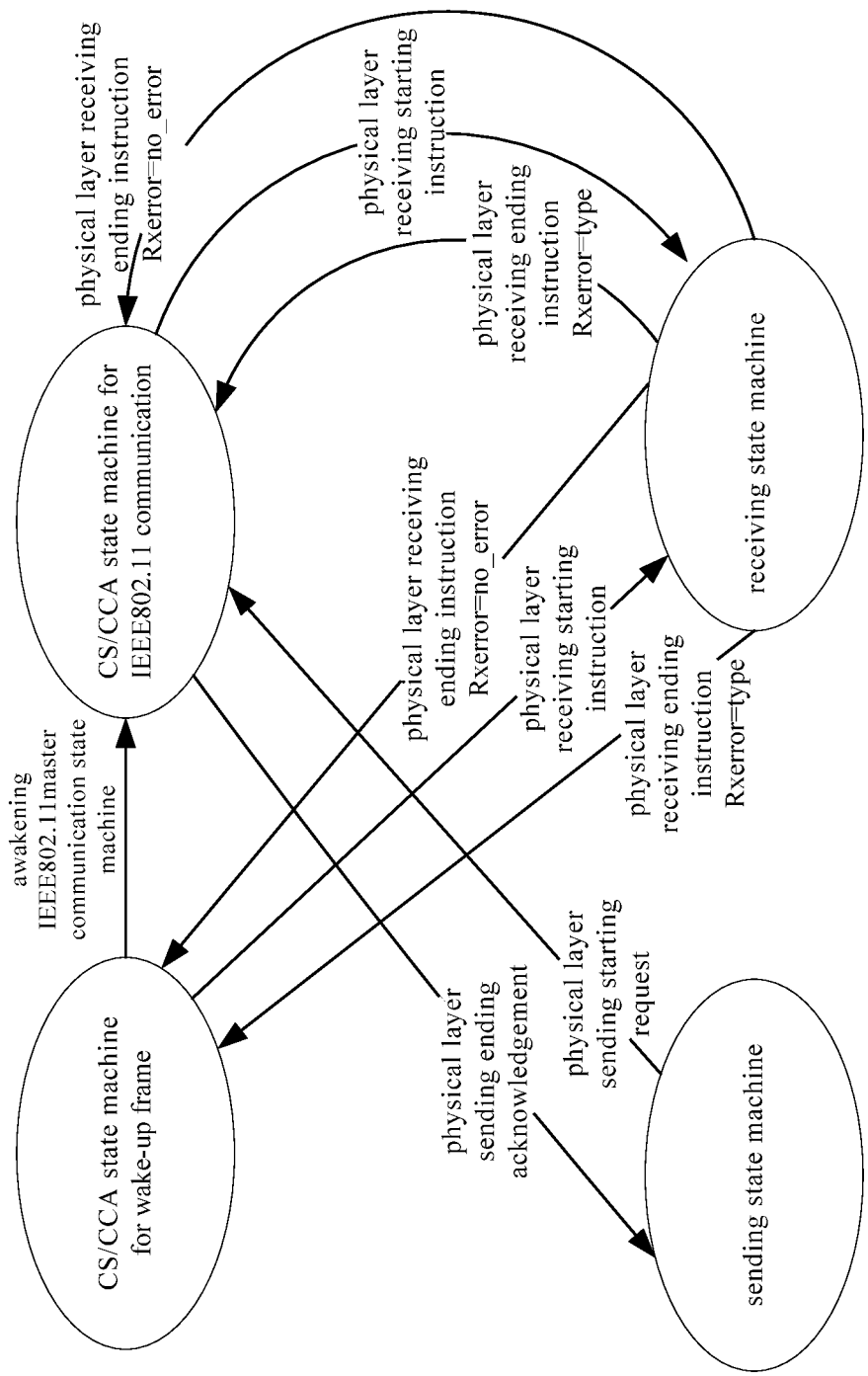
FIG. 6 is a schematic diagram illustrating an interaction process of a CS/CCA state machine with a receiving state machine and a sending state machine according to the second embodiment of the present disclosure.

As shown in FIG. 6, one device may have two physical entity CS/CCA state machines, one is for sensing a wake-up frame (i.e., the CS/CCA state machine for a wake-up frame shown in FIG. 6), and the other is for sensing a normal data frame (i.e. the CS/CCA state machine for IEEE802.11 communication shown in FIG. 6), that is, the CS/CCA state machine for sensing a wake-up frame is physically separated from the CS/CCA for sensing a normal data frame. After the receiving state machine receives a communication frame, if the CS/CCA state machine for sensing a wake-up frame senses that the communication frame is a wake-up frame, the CS/CCA state machine for sensing a normal data frame is awakened, so that the device enters the awake state and then sends data via the sending state machine.

The technical solutions of the present disclosure have been described in detail with reference to the accompanying drawings. The present disclosure proposes a new communication solution for a wireless local area network, so that a device can respectively sense a wake-up frame and a normal data frame via different CS/CCA state machines physically separated or logically separated, fulfilling the requirements of the WUR, and thereby facilitating the reduction of device energy consumption.

The foregoing descriptions are merely preferred embodiments of the present disclosure and are not intended to limit the present disclosure. For those skilled in the art, the present disclosure may have various modifications and changes. Any modifications, equivalent substitutions, improvements and the like made within the spirit and principle of the present disclosure should be encompassed in the protection scope of the present disclosure.

The invention claimed is:

1. A communication method for a wireless local area network, comprising:
   receiving a communication frame, and sensing a receiving power of the communication frame via a CS/CCA state machine, wherein a CS/CCA state machine for sensing a wake-up frame and a CS/CCA state machine for sensing a non-wake-up frame are physically separated or logically separated; and
   determining the type of the communication frame, according to the receiving power of the communication frame.

2. The communication method for a wireless local area network according to claim 1, wherein,
   the step of determining, according to the receiving power of the communication frame, the type of the communication frame specifically comprises:
   determining that the communication frame is a wake-up frame, when the receiving power of the communication frame is less than or equal to a predetermined power value; and
   determining that the communication frame is a non-wake-up frame, when the receiving power of the communication frame is greater than the predetermined power value.

3. The communication method for a wireless local area network according to claim 1 or 2, further comprising:
   entering an awake state to communicate with a sender of the communication frame, when it is determined that the communication frame is a wake-up frame.

4. A communication method for a wireless local area network, comprising: generating a wake-up frame; and
   sending the wake-up frame by using a sending power which is less than or equal to a predetermined value.

5. A communication apparatus for a wireless local area network, comprising:
   a receiving device for receiving a communication frame;
   a sensing device for sensing a receiving power of the communication frame via a CS/CCA state machine, wherein a CS/CCA state machine for sensing a wake-up frame and a CS/CCA state machine for sensing a non-wake-up frame are physically separated or logically separated; and
   a determining device for determining the type of the communication frame, according to the receiving power of the communication frame.

6. The communication apparatus for a wireless local area network according to claim 5, wherein, the determining device is specifically used for:
   determining that the communication frame is a wake-up frame when the receiving power of the communication frame is less than or equal to a predetermined power value; and
   determining that the communication frame is a non-wake-up frame when the receiving power of the communication frame is greater than the predetermined power value.

7. The communication apparatus for a wireless local area network according to claim 5, further comprising:
   a processing device for entering an awake state to communicate with a sender of the communication frame, when the determining device determines that the communication frame is a wake-up frame.

8. A communication apparatus for a wireless local area network, comprising:
   a generating device for generating a wake-up frame; and
   a sending device for sending the wake-up frame by using a sending power which is less than or equal to a predetermined value.

9. The communication apparatus for a wireless local area network according to claim 6, further comprising:
   a processing device for entering an awake state to communicate with a sender of the communication frame, when the determining device determines that the communication frame is a wake-up frame.

10. An access point, comprising:
    the communication apparatus for a wireless local area network according to any of claims 5-7 or claim 9; and/or
    the communication apparatus for a wireless local area network according to claim 8.

11. A station, comprising:
    the communication apparatus for a wireless local area network according to any of claims 5-7 or claim 9; and/or
    the communication apparatus for a wireless local area network according to claim 8.

* * * * *